Aug. 29, 1967  R. H. KRASNITZ ETAL  3,338,101
BOURDON TUBE GAUGES

Filed Oct. 21, 1965  2 Sheets-Sheet 1

INVENTORS
Ronald H. Krasnitz.
Louis W. Schultz.

By William J. Newman
Attorney

INVENTORS
Ronald H. Krasnitz.
Louis W. Schultz.

By William J. Newman
Attorney

United States Patent Office 3,338,101
Patented Aug. 29, 1967

3,338,101
BOURDON TUBE GAUGES
Ronald H. Krasnitz, Chicago, and Louis W. Schultz, Oakbrook, Ill., assignors to Stewart-Warner Corporation, Chicago, Ill., a corporation of Virginia
Filed Oct. 21, 1965, Ser. No. 499,543
11 Claims. (Cl. 73—411)

This invention relates to pressure indicating devices and more particularly to fluid pressure indicating devices of the Bourdon tube type.

In the past Bourdon tube pressure gauges were mostly of the internally pressurized type. Generally the internally pressurized gauges comprised a curved hollow tube having an oval or elliptical cross-section. One end of the curved tube was fixed with respect to the gauge housing and usually connected to the pressure source being measured. The other end of the curved tube was sealed, but not fixed with respect to the gauge housing so that variations in the internal pressure caused a deflection of that end. An indicator such as a pointer was mechanically linked to the unfixed end of the tube to register the amount of pressure variation.

Internally pressurized gauges have been found unsuitable in many applications requiring rugged but sensitive and accurate devices. The internally pressurized devices could not adequately withstand mechanical and fluid pressure vibrations without fatiguing before the desired lifetime of the gauge. Those devices which were constructed to withstand such deleterious forces resulted in expensive, cumbersome and sometimes less sensitive instruments.

It is an object of this invention to provide a novel, externally pressurized, Bourdon tube type, fluid pressure gauge.

Also, it is an object of this invention to provide a sensitive Bourdon tube type pressure gauge which is rugged in construction and able to withstand mechanical as well as fluid pressure vibrations.

A further object of this invention is to provide a pressure gauge of novel construction permitting inexpensive production techniques and materials.

It is a feature of this invention to provide a novel magnetic drive arrangement between the Bourdon tube and the indicating means.

Another feature of this invention is to provide a unique calibrating arrangement for an externally pressurized Bourdon tube pressure gauge utilizing a magnetic drive. Other objects, features and advantages of this invention will become apparent upon a further reading of this specification especially when taken in view of the accompanying drawings in which.

Figure 3:
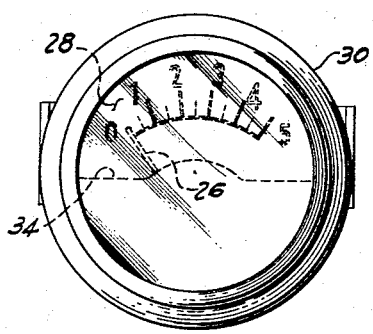
FIG. 3 is an unbroken front view of the pressure gauge showing the indicating face of the gauge.
Figure 4:
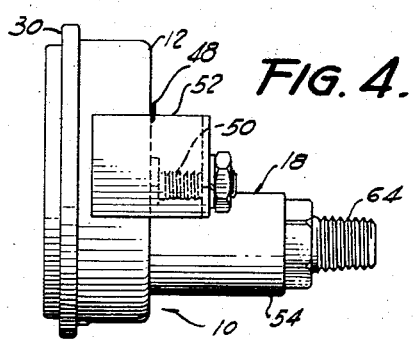
FIG. 4 is an unbroken side view of the gauge.
Figure 1:
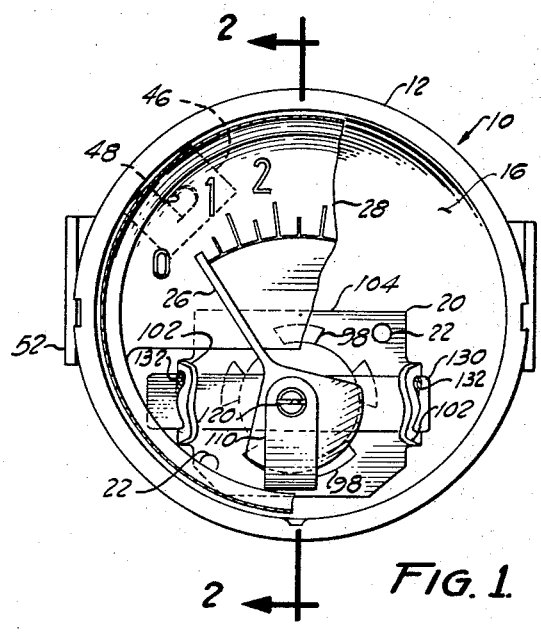
FIG. 1 is a front view, partially broken away, of a preferred embodiment of a pressure gauge embodying the teachings of this invention.
Figure 2:
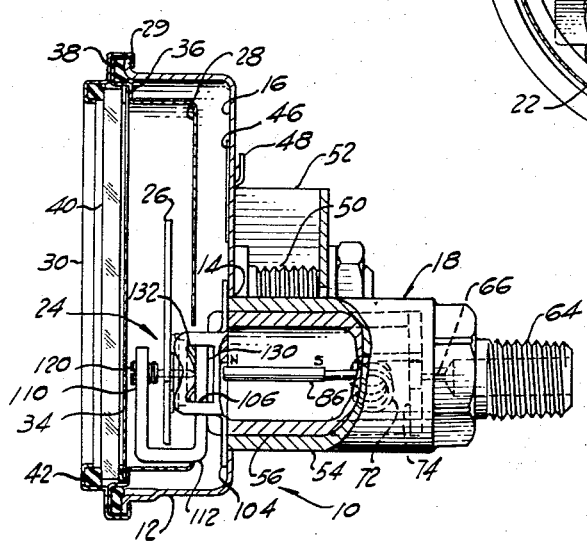
FIG. 2 is a partially sectioned side view of the pressure gauge shown in FIG. 1.

Referring first to FIGS. 1 through 4, the pressure gauge 10 comprises a case 12 having an aperture 14 in its rear wall 16 in receipt of a pressure capsule 18, the function and construction of which will be described hereinafter. A bracket 20 attached to the capsule 18 in a manner to be described in detail later supports the capsule 18 on the case 12 by means of rivets 22 or the like.

The bracket 20 also carries a slide and pointer assembly 24 to be hereinafter described within the case 12. The assembly 24 includes a pointer 26 which registers with a dial 28 to indicate the pressure measurement. The dial is supported on the case 12 by means of the bezel 30 which clamps the dial 28 and a sealing gasket 32 to a flange 29 about the case 12.

A mask 34 for hiding the operating mechanism of the gauge is held against a shoulder 36 formed in the dial 28 by means of a gasket 38, a glass plate 40 and another gasket 42 all of which are held in place by the bezel 30 to form a substantially pressure type unit. A vent 46 is provided at the back of the case 16 to relieve the interior of the case 12 in case of pressure build-up, thus avoiding the possibility of the glass 40 exploding. The vent 46 comprises a punched perforation 48 in the case 12 with a thin yieldable diaphragm 48 such as tin or aluminum foil cemented across the perforation within the case 12. Two studs 50 are welded to the back of the case 12 and carry a mounting bracket 52 for supporting the gauge 10 in an instrument panel, or the like, in a well known manner.

Figure 5:
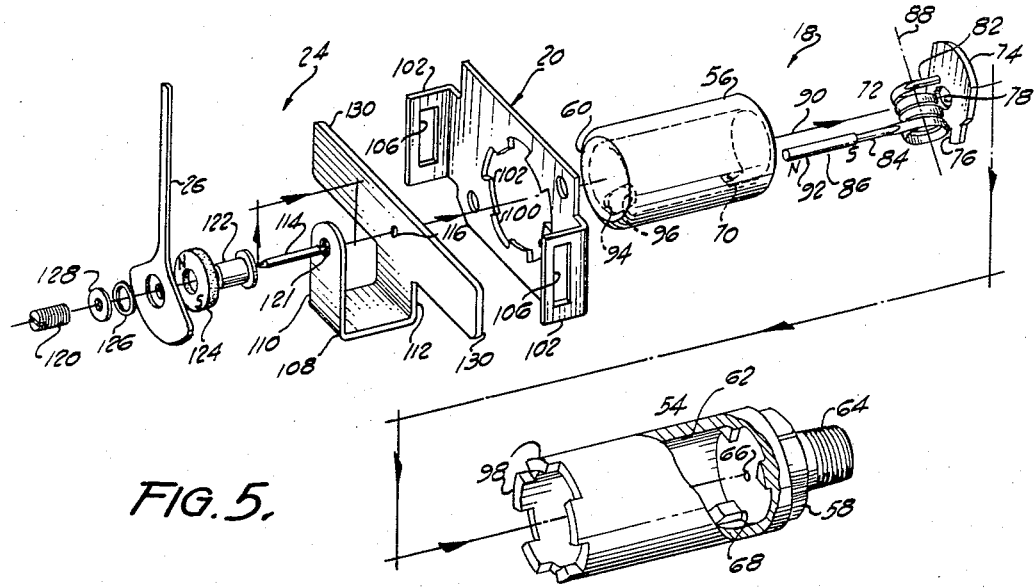
FIG. 5 is an exploded, isometric view of the operational components of the pressure gauge.

Reference is now made to FIG. 5 for a detailed description of the pressure capsule 18 and the pointer and slide assembly 24. The pressure capsule 18 is comprised of two cup-shaped members 54, 56 with the member 56 fitting snugly within the member 54 and their respective closed ends 58 and 60 being oppositely disposed to define a closed chamber 62. The two members 54, 56 are held together and sealed by an epoxy type adhesive preferably of the heat curing type such as Hysol type A7–5270 a product of the Hysol Corporation. The cup-shaped member 54 has a threaded nipple 64 at its closed end 58 for connection with the pressure source to be measured and a restricted passage 66 connects the chamber 62 with the interior of the nipple 64.

The restricted passage 66 between the pressure source and the chamber 62 has the effect of dampening rapid pressure oscillations. The fluid from the pressure source enters the capsule 18 through the restricted passageway 66 when the gauge is connected to the pressure source. When the chamber 62 is filled, however, rapid changes in the pressure at the source are not transmittable to the chamber 62 because of the dynamic pressure loss caused by the restrictive passage 66. Thus, the fluid in the chamber 62 is responsive primarily to changes in static pressure at the pressure source but only slightly responsive to dynamic pressure changes.

The cup-shaped members 54 and 56 are formed of a non-magnetic material and preferably are fabricated of aluminum because of its strength, its cost and its easy workability. These members may thus be formed by impact extrusion methods which are quite inexpensive. Formation by impact extrusion permits the use of a key 68 and keyway 70 for positioning the two members 54, 56 without requiring expensive machining processes.

Within the chamber 62 is a helical wound Bourdon tube 72 mounted on a plate 74 which is held between the open end of the inner member 56 and the closed end of the outer member 54. It also is positionally located by the key 68 which is received within its keyway 76, and has an opening 78 which is aligned with the restricted passage 66 in the member 64. The Bourdon tube 72 is completely sealed at both ends with its one end 80 cemented to and supported by a pin 82 mounted on the plate. The free end 84 of the Bourdon tube 72 carries a magnet 86. A poly-amide adhesive having a relatively high melting point, such as that sold under the trade name Versalon by General Mills Company, is preferably used for cementing the tube 72 to the pin 82 and the magnet 86 to the tube 72 so that it will not melt during the heat curing of the epoxy joining the two members 54, 56.

The helical wound Bourdon tube 72 is positioned within the capsule 18 so that its axis 88 is generally at cross angles to the axis 90 of the cylindrical capsule 18 with the magnet 86 on the free end 84 thereof extending substantially parallel with the axis 90 so that the magnetic pole 92 at the free end of the magnet 86 is disposed within a recess 94 formed in the interior surface of the closed end 60 of the inner cup member 56. It is to be noted that the recess 94 is also easily provided in the member 56 by using impact extrusion fabricating techniques.

It may be seen that the free end 92 of the magnet will be moved along a substantially linear path of travel as the pressure differential between the sealed interior of the Bourdon tube 72 and the fluid within the chamber 62 surrounding the Bourdon tube 72 is varied. The recess 94 is thus oblong shaped extending in a direction defined by the path of travel of the free end 92 of the magnet 86. The key 68 in the outer member 54 and the keyways 70 and 76 in the inner member 56 and plate 74, respectively, locate the various components during the fabrication of the gauge so that the free end 92 of the magnet 86 dwells within the recess 94 adjacent the one end 96 at an at-rest position. The at-rest position will generally represent a zero pressure differential between the interior and the exterior of the Bourdon tube 72. However, it is to be understood that it could be arranged that contact may be made between the magnet end 92 and the end 96 of the recess 94 to place a biasing force on the helical wound tube 72, thus fixing the gauge for registering pressures within a range above a certain minimum.

The bracket 20 which carries the pin and slide assembly 24 is attached to the capsule 18 by means of splines 98 extending from the open end of the exterior cup-shaped member 54 beyond the closed end 60 of the interior cup-shaped member 56. The splines 98 mate with the splines 100 about the punched aperture 102 in the support bracket 20. The sizes of the splines 98 are keyed to the sizes of the splines 100 to position the bracket with respect to the capsule 18, and the bracket is secured to the capsule by staking the ends of the splines 98. A pair of integral legs 102 project from the main portion 104 of the support bracket 20 and define confronting apertures adjacent to and across the end of the capsule 18 in which are adapted to receive and support the pointer and slide assembly 24.

The pointer and slide assembly 24 comprises a substantially U-shaped slide member 108 having two legs 110 and 112. A pivot shaft 114 is journalled at one pointed end in a conical bearing 116 formed by a drilled or pressed recess in the leg 112 of the U-shaped member 108. The other pointed end of the shaft 114 is journalled in a conical bearing formed in a socket screw 120 received in a threaded aperture 121 in the leg 110 of the slide member 108. The shaft 114 has a bushing 122 press-fit thereon on which a disc magnet 124 is cemented. The pointer 26 fits loosely over the end of the bushing 122 projecting through the magnet 124. A crimped spring washer 126 held into place by a washer 128 press-fit onto the shaft 114 holds the pointer in slideable friction engagement against the magnet 124 so that its angular relationship with the magnetic axis 134 of the disc magnet 124 may be adjusted.

The leg 112 of the U-shaped slide member 108 has a pair of oppositely projecting extensions 130 which are received within the apertures 106 in the support bracket 20. When so assembled the disc magnet 124 carried thereby is in magnetic relationship with the pole 92 of the bar magnet 86 inside the capsule 18. The disc magnet 124 thus aligns itself so that its oppositely polarized pole assumes its closest angular position to the bar magnet pole 92. As the pressure in the chamber 62 of the capsule 18 changes the free pole end of the bar magnet 86 travels along the recess 94 and its attractive force on the disc magnet 124 causes it, along with the pointer 26, to rotate about the axis defined by the shaft 114. The sliding arrangement of the assembly 124 within the bracket apertures 106 is provided for calibration purposes as hereinafter described, and the assembly 124 is fixed to the support bracket 20 after calibration by crimping the legs 102 of the bracket 20 and cementing with a hot-melt adhesive as shown at 132 of FIG. 2.

Figure 6:
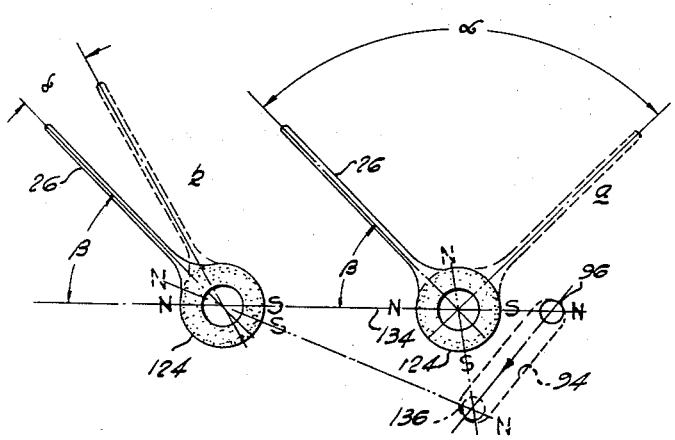
FIG. 6 is a partially schematic detail showing the operation of the calibrating means for the gauge.

FIG. 6 shows in somewhat schematic form the principles upon which the sliding arrangement between the slide assembly 24 and the bracket 20 accomplishes calibration. The free end 92 of the bar magnet is shown at its at-rest position at the one end 96 of the recess 94 and is caused to travel downwardly and leftwardly towards the other end 136 of the recess 94 responsive to increases in pressure. The disc magnet 124 naturally aligns itself so that its axis of polarization 134 is in alignment with the magnet 86. As the pressure is increased and the magnet 86 travels towards its limit position at the other end 136 of the recess 94 the disc magnet 124 rotates about its axis with the pointer moving through the angle $\alpha$. In the positional condition denoted $a$ in FIG. 6 where the magnet 124 is very close to the path of travel of the bar magnet pole 92, the pointer 26 moves through an angle $\alpha$ approximately 90° for a full deflection of the magnet pole 92. However, if the disc magnet 124 is moved a substantial distance from the path of travel of the bar magnet pole 92 as shown at $b$ in FIG. 6, the angle through which the pointer 26 rotates is substantially reduced. It is to be noted, however, that by moving the rotational axis of the disc magnet transversely along the line 134 defined by its polar axis when the bar magnet 86 is in its at-rest position, the angle $\beta$ between the pointer 26 and the line 134 does not change. This permits the gauge to be easily calibrated by the following procedures.

When the components are all assembled with the pointer and slide assembly 24 in slideable support with the apertures 106 of the support bracket 20 the pointer 26 may be rotated with respect to the disc magnet 124 to fall on the zero position. The pressure in the chamber 62 is then raised to the full scale value and the position of pointer 26 with the full scale indication on the dial 28 is noted. If the pointer and dial do not properly register the full scale pressure the pin and slide assembly 24 is slideably translated until the full scale reading is accomplished. The slide assembly is then cemented into position so that it remains in calibration.

It is to be noted that the actual amount of sliding adjustment required to arrive at the full scale indication is generally very small and would never reach the extreme shown in FIG. 6b. Hence, the slight disturbance of the zero indication is generally of an insignificant amount to cause concern. However, even this slight amount of disturbance of the zero position may be eliminated by changing the location of the at-rest position of bar magnet pole 92 so that the disc magnet 124 has its polar axis in alignment with the pointer 26 in the at-rest position. The direction along which the slide member 108 slides within the bracket 20 must also be changed to coincide with the direction of the pointer 26. This arrangement, however, was not used in the preferred embodiment disclosed because of the positional relationships of all of the components of the gauge.

It is recognized that many modifications and additions may be made to the preferred embodiment disclosed without materially departing from the teachings herein. It is therefore intended to be limited only by the scope of the appending claims.

What is claimed is:

1. A pressure indicating device comprising a pressure capsule having a passage therethrough adapted to communicate with a pressure source, a coiled, sealed, Bourdon tube within said capsule having one end fixedly supported thereto, a first magnet carried by the other end of said tube; means for fixing the position of said tube so that one of the poles of said first magnet is normally positioned at an at-rest position and is movable away from said at-rest position responsive to changes in pressure; and an indicator assembly outside of said capsule including a pointer and a second magnet in magnetic relationship with said first magnet for indicating said changes in pressure.

2. A pressure indicating device comprising a pressure capsule formed of a first cylindrical cup-shaped member and a second cylindrical cup-shaped member adhesively sealed within said first member, the respective closed ends of said members being oppositely disposed from each other, the closed end of one of said members having a passage therethrough adapted to communicate with a pressure source, a sealed, coiled hollow tube within said capsule having one end supported thereby; a first magnet carried by the other end of said tube; means fixing the position of said tube so that one of the poles of said first magnet is normaly positioned at an at-rest position and is movable therefrom responsive to changes in pressure; and means outside of said capsule including a pointer and a second magnet in magnetic relationship with said first magnet for indicating said changes in pressure.

3. In a pressure indicating device, the improvement comprising a pressure capsule having a passage therethrough adapted to communicate with a pressure source, a sealed Bourdon tube within said capsule having one end fixedly supported thereto, a first magnet carried by the other end of said tube; said tube being supported so that one of the poles of said first magnet is normally positioned at an at-rest position and is movable away from said at-rest position responsive to changes in pressure; an indicator assembly outside of said capsule, said assembly comprising a second magnet having a pair of magnetic poles, and means supporting said second magnet for rotation about an axis transverse to the line defined by said magnetic poles; and means supporting said assembly with respect to said capsule with one of the poles of said second magnet in magnetically attractive relationship with the one pole of said first magnet, said assembly being adjustably positionable with respect to said capsule along a direction defined by the poles of said second magnet when said first magnet is at its at-rest position.

4. A liquid pressure indicating device comprising a pressure capsule formed of a first cylindrical cup-shaped member and a second cylindrical cup-shaped member adhesively sealed within said first member, the respective closed ends of said members being oppositely disposed from each other, the closed end of one of said members having a restricted passage therethrough adapted to communicate with a pressurized liquid source; a sealed, coiled, hollow tube within said capsule having one end supported thereby; a first magnet carried by the other end of said tube; means fixing the position of said tube so that one of the poles of said first magnet is normally positioned at an at-rest position and is movable therefrom responsive to changes in pressure; and means outside of said capsule including a pointer and a second magnet in magnetic relationship with said first magnet for indicating said changes in pressure.

5. In a liquid pressure indicating device, the improvement comprising a pressure capsule having a restricted passage therethrough adapated to communicate with a pressurized liquid source, a sealed, coiled, hollow tube within said capsule having one end fixedly supported thereto, a first magnet carried by the other end of said tube, said tube being supported so that one of the poles of said first magnet is normally positioned at an at-rest position and is movable away from said at-rest position responsive to changes in pressure; an assembly outside of said capsule, said assembly comprising a second magnet having a pair of magnetic poles, and means supporting said second magnet for rotation about an axis transverse to the line defined by said magnetic poles; and means supporting said assembly with respect to said capsule with one of the poles of said second magnet in magnetically attractive relationship with the one pole of said first magnet, said assembly being adjustably positionable with respect to said capsule along a direction defined by the poles of said second magnet when said first magnet is at its at-rest position.

6. A liquid pressure gauge comprising a pressure capsule having a restricted passage therethrough adapted to communicate with a pressurized liquid source, a helical-wound, sealed, hollow tube within said capsule having one end fixedly supported thereto, a first magnet carried by the other end of said tube; means for fixing the position of said helical-wound tube so that one of the poles of said first magnet is normally positioned at an at-rest position and is movable therefrom responsive to changes in pressure; an indicator assembly outside of said capsule, said assembly comprising a pointer, a second magnet having a pair of magnetic poles, and means supporting said pointer and said second magnet for rotation about an axis transverse to the line defined by said magnetic poles; means supporting said indicator assembly with respect to said capsule with one of the poles of said second magnet in magnetically attractive relationship with said one pole of said first magnet, said assembly being adjustably positionable with respect to said capsule along a direction defined by the poles of said second magnet when said first magnet is at its at-rest position; and a dial in registry with said pointer.

7. A liquid pressure indicating device comprising a pressure capsule formed of a first cylindrical cup-shaped member and a second cylindrical cup-shaped member within said first member, the respective closed ends of said members being oppositely disposed from each other, an adhesive material between the exterior of said second member and the interior of said first member for sealing and binding said members together, the closed end of said first member having a restricted passage therethrough adapted to communicate with a pressurized liquid source; a plate within said capsule in abutment with the closed end of said first member maintained thereat by said second member and having an opening aligned with said passage; a sealed, coiled, hollow tube having one end supported by said plate; a first magnet carried by the other end of said tube; a key on the interior of said first member and a keyway on said plate for fixing the positon of said plate and said tube so that one of the poles of said first magnet is normally positioned at an at-rest position and is movable therefrom responsive to changes in pressure; and means outside of said capsule including a pointer and a second magnet in magnetic relationship with said first magnet for indicating said changes in pressure.

8. A liquid pressure gauge comprising a pressure capsule formed of a first cylindrical cup-shaped member and a second cylindrical cup-shaped member adhesively sealed within said first member, the respective closed ends of said members being oppositely disposed from each other, the closed end of said first member having a restricted passage therethrough adapted to communicate with a pressurized liquid source, the inside of the closed end of said second member having an elongated recess; a plate within said capsule in abutment with the closed end of said first member maintained thereat by said second member and having an opening aligned with said passage; a helical-wound, sealed, hollow tube having one end supported by said plate with the axis thereof aligned transversely to the longitudinal axis of said capsule, the other end of said tube extending substantially parallel to the longitudinal axis of said capsule; a longitudinally polarized bar magnet carried by said other end of said tube; means on the interior of said first member for fixing the position of said plate and said helical-wound tube so that the other end of said bar magnet is normally positioned at an at-rest position adjacent one end of said recess and is movable along a path of travel toward the other end of said recess responsive to increases in pressure, the other end of said recess defining the maximum limit of measurable pressure; a substantially U-shaped slide member having two legs, a shaft having each of its ends journalled in a respective one of said legs for rotation about an axis defined thereby, a diametrically polarized disc magnet fixed on said shaft, a pointer carried by said shaft and adjutsably rotatable with respect to said disc, one of the legs of said U-shaped member having a pair of extensions oppositely projecting therefrom along a direction perpendicular to the axis of rotation of said shaft; a support bracket carried by said capsule having a pair of legs defining confronting apertures adjacent to and across the closed end of said second member for receiving said pair of extensions with the poles of said disc magnet being attracted into alignment with the other end of said bar magnet, said apertures being diametrically aligned to permit transverse calibrating adjustment of said shaft along a line defined by the poles of said disc magnet when said bar magnet is at said at-rest position; and a dial in registry with said pointer.

9. A liquid pressure gauge comprising a pressure capsule formed of a first cylindrical cup-shaped member and a second cylindrical cup-shaped member adhesively sealed within said first member, the respective closed ends of said members being oppositely disposed from each other, a key on the interior of said first member, a keyway in said second member in receipt of said key, the closed end of said first member having a restricted passage therethrough adapted to communicate with a pressurized liquid source, the inside of the closed end of said second member having an elongated recess; a plate within said capsule in abutment with the closed end of said first member maintained thereat by said second member and having an opening aligned with said passage; a helical-wound, sealed, hollow tube having one end supported by said plate with the axis thereof aligned transversely to the longitudinal axis of said capsule, the other end of said tube extending substantially parallel to the longitudinal axis of said capsule; a longitudinally polarized bar magnet carried by said other end of said tube; a second keyway in said plate in recipt of said key for fixing the position of said plate and said helical-wound tube so that the other end of said bar magnet is normally positioned at an at-rest position adjacent one end of said recess and is movable along a path of travel toward the other end of said recess responsive to increases in pressure, the other end of said recess defining the maximum limit of measurable pressure; a substantially U-shaped slide member having two legs, a shaft having each of its ends journalled in a respective one of said legs for rotation about an axis defined thereby, a diametrically polarized disc magnet fixed on said shaft, a pointer carried by said shaft and adjustably rotatable with respect to said disc, one of the legs of said U-shaped member having a pair of extensions oppositely projecting therefrom along a direction perpendicular to the axis of rotation of said shaft; a support bracket carried by said capsule having a pair of legs defining confronting apertures adjacent to and across the closed end of said second member for receiving said pair of extensions with the poles of said disc magnet being attracted into alignment with the other end of said bar magnet, said apertures being diametrically aligned to permit transverse calibrating adjustment of said shaft along a line defined by the poles of said disc magnet when said bar magnet is at said at-rest position; and a dial in registry with said pointer.

10. A liquid pressure gauge comprising a pressure capsule formed of a first cylindrical cup-shaped member and a second cylindrical cup-shaped member within said first member, the respective closed ends of said members being oppositely disposed from each other, an adhesive material between the exterior of said second member and the interior of said first member for sealing and binding said members together, the closed end of said first member having a restricted passage therethrough adapted to communicate with a pressurized liquid source, the inside of the closed end of said second member having an elongated recess; a plate within said capsule in abutment with the closed end of said first member maintained thereat by said second member and having an opening aligned with said passage; a helical-wound, sealed, hollow tube having one end supported by said plate with the axis thereof aligned transversely to the longitudinal axis of said capsule, the other end of said tube extending substantially parallel to the longitudinal axis of said capsule; a longitudinally polarized bar magnet carried by said other end of said tube; a key on the interior of said first member and a keyway in said plate for fixing the position of said plate and said helical-wound tube so that the other end of said bar magnet is normally positioned at an at-rest position adjacent one end of said recess and is movable along a path of travel toward the other end of said recess responsive to increases in pressure, the other end of said recess defining the maximum limit of measurable pressure; a substantially U-shaped slide member having two legs, a shaft having each of its ends journalled in a respective one of said legs for rotation about an axis defined thereby, a diametrically polarized disc magnet fixed on said shaft, a pointer carried by said shaft and adjustably rotatable with respect to said disc, one of the legs of said U-shaped member having a pair of extensions oppositely projecting therefrom along a direction perpendicular to the axis of rotation of said shaft; a support bracket carried by said capsule having a pair of legs defining confronting apertures adjacent to and across the closed end of said second member for receiving said pair of extensions with the poles of said disc magnet being attracted into alignment with the other end of said bar magnet, said apertures being diametrically aligned to permit transverse calibrating adjustment of said shaft along a line defined by the poles of said disc magnet when the other end of said bar magnet is at said at-rest position; a case having a glass plate sealed across the face thereof; and a dial in registry with said pointer.

11. A liquid pressure gauge comprising a pressure capsule formed of a first cylindrical cup-shaped member and a second cylindrical cup-shaped member within said first member, the respective closed ends of said members being oppositely disposed from each other, a key on the interior of said first member, a keyway in said second member in receipt of said key, an adhesive material between the exterior of said second member and the interior of said first member for sealing and binding said members together, the closed end of said first member having a restricted passage therethrough adapted to communicate with a pressurized liquid source, the inside of the closed end of said second member having an elongated recess; a plate within said capsule in abutment with the closed end of said first member maintained thereat by said second member and having an opening aligned with said passage; a helical-wound, sealed, hollow tube having one end supported by said plate with the axis thereof aligned transversely to the longitudinal axis of said capsule, the other end of said tube extending substantially parallel to the longitudinal axis of said capsule; a longitudinally polarized bar magnet carried by said other end of said tube; a second keyway in said plate in recipt of said key for fixing the position of said plate and said helical-wound tube so that the other end of said bar magnet is normally positioned at an at-rest position adjacent one end of said recess and is movable along a path of travel toward the other end of said recess responsive to increases in pressure, the other end of said recess defining the maximum limit of measurable pressure; a substantially U-shaped slide member having two legs, a shaft having each of its ends journalled in a respective one of said legs for rotation about an axis defined thereby, a diametrically polarized disc magnet fixed on said shaft, a pointer carried by said shaft and adjustably rotatable with respect to said disc, one of the legs of said U-shaped member having a pair of extensions oppositely projecting therefrom along a direction perpendicular to the axis of rotation of said shaft; a support bracket carried by said capsule having a pair of legs defining confronting apertures adjacent to and across the closed end of said second member for receiving said pair of extensions with the poles of said disc magnet being attracted into alignment with the other end of said bar magnet, said apertures being diametrically aligned to permit transverse calibrating adjustment of said shaft along a line defined by the poles of said disc magnet when said bar magnet is at said at-rest position; a case having a glass plate sealed across the face thereof; and a dial in registry with said pointer.

References Cited
UNITED STATES PATENTS 3,177,722   4/1965   Huston _____ 73—418

LOUIS R. PRINCE, *Primary Examiner.*

D. O. WOODIEL, *Assistant Examiner.*